United States Patent
Hiller et al.

(10) Patent No.: US 7,248,566 B2
(45) Date of Patent: Jul. 24, 2007

(54) WIRELESS NETWORK WITH TRANSMISSION CONTROL IN A HALF-DUPLEX VOICE CONFERENCE MODE

(75) Inventors: Thomas Lloyd Hiller, Glen Ellyn, IL (US); Peter James McCann, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 997 days.

(21) Appl. No.: 10/334,080

(22) Filed: Dec. 30, 2002

(65) Prior Publication Data

US 2004/0125790 A1 Jul. 1, 2004

(51) Int. Cl.
*H04L 12/38* (2006.01)
(52) U.S. Cl. .................. 370/263; 370/386; 375/133

(58) Field of Classification Search ................ 370/263, 370/386; 375/133, 219, 354
See application file for complete search history.

(56) References Cited

U.S. PATENT DOCUMENTS

2002/0044534 A1* 4/2002 Cohen ................ 370/263
2004/0258136 A1* 12/2004 Liu et al. ............ 375/133

* cited by examiner

*Primary Examiner*—Creighton Smith

(57) ABSTRACT

Voice packets transmitted by an originating wireless user for use in a half-duplex communication mode in a one to many communication session are monitored for an unexpected cessation. If an unexpected cessation of such voice packets is detected for a predetermined time period, the session server controlling the communications session is notified to release the supporting half-duplex communication paths associated with the originating user.

7 Claims, 3 Drawing Sheets

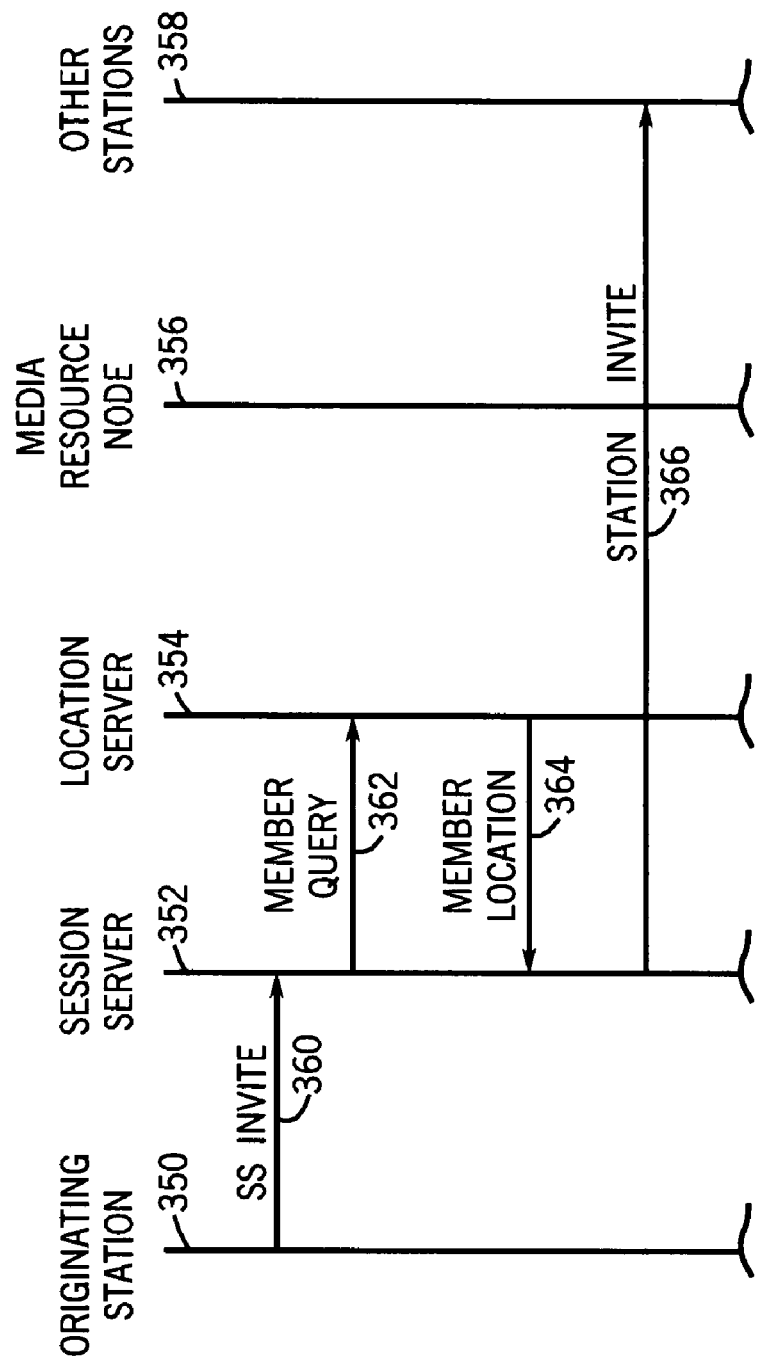

US 7,248,566 B2

WIRELESS NETWORK WITH TRANSMISSION CONTROL IN A HALF-DUPLEX VOICE CONFERENCE MODE

BACKGROUND

This invention generally relates to a wireless telecommunications system that provides a one-to-many voice conference mode, and more specifically relates to limiting the ability of a user in a packet system that loses communication with the system in the talk mode to disrupt communications.

One example of a wireless system providing a one-to-many transmission mode is a conventional police or fire radio system. In an analog system with a single base station, a first user captures the base station by an initial transmission activated by a push to talk button. The first user's voice transmission is received by the base station and retransmitted to the other users. The transmission by the first user ends by the first user releasing the push to talk button. This allows one of the other users to reply to the first user or initiate a new transmission by activating his radio with the push to talk button. In this system a radio frequency carrier is on during the entire voice transmission. Loss of the radio frequency carrier, whether caused by the user releasing the push to talk button or by the user leaving the area of coverage, causes the base station to release its retransmission and allows another user to be able to access the system.

A wireless network that carries speech as digitized samples in packets presents additional difficulties with regard to transmission control especially where the packets are transferred from the wireless portion of the network to a wired portion of the network. This is especially apparent where the system utilizes a half-duplex transmission mode in which only one user is permitted to transmit voice communications at a time. Unlike the above example of an analog wireless system in which a radio frequency carrier was always present during a speech transmission, the speech packets carried on the wired system are decoupled from the wireless portion of the system and hence information concerning the status of wireless communications link is normally not available at packet nodes in the wired system. A packet based system having both a wireless and wired portion typically relies upon an end of transmission signal transmitted from the active (talking) user at the end of voice transmission such as initiated by the release of a push to talk button. This signal is conveyed through the wireless and wired portions of the system informing all involved transmission nodes that the stream of packets carrying voice from the active user has ceased. Failure to receive the end of transmission signal at a node in the network may cause the node to take inappropriate actions or fail to take appropriate actions. Such a problem is especially acute where a node hinders further communications by other users due to the failure to receive an end of transmission signal. Thus, there exists the need for an improved method for minimizing problems associated with the lack of receipt of an end of transmission signal in a packet system.

SUMMARY OF THE INVENTION

It is an object of the present invention to minimize problems associated with the lack of receipt of an end of transmission signal in a packet system. An object of the present invention includes, but is not limited to, minimizing such problems in packet system employing a half-duplex voice conference mode.

In accordance with an exemplary method of the present invention, a method is provided for releasing half-duplex communication paths in a telecommunications system where speech by an originating user is transmitted as packets and where an end of transmission signal for releasing the half-duplex communication paths is normally initiated by the originating user releasing a push to talk button. Half-duplex communication paths for speech from the originating user are established to a plurality of listing users by a session server. Packets of speech received from the originating user are replicated and transmitted to the plurality of listening users by a media resource function. The cessation of speech from the originating user for a predetermined time interval is monitored at the media resource function and a loss of speech signal is transmitted to the session server upon the cessation of speech for the predetermined time interval. The half-duplex communication paths are released by the session server upon receipt of the loss of speech signal.

BRIEF DESCRIPTION OF THE DRAWINGS

FIG. 5 is a diagram illustrating the transmission of relevant signals in the system as shown in FIG. 4 in which the location of users determines which users will receive half-duplex communications from the originating user.

The same reference numeral is used to identify like elements in different figures.

DETAILED DESCRIPTION

Figure 1:
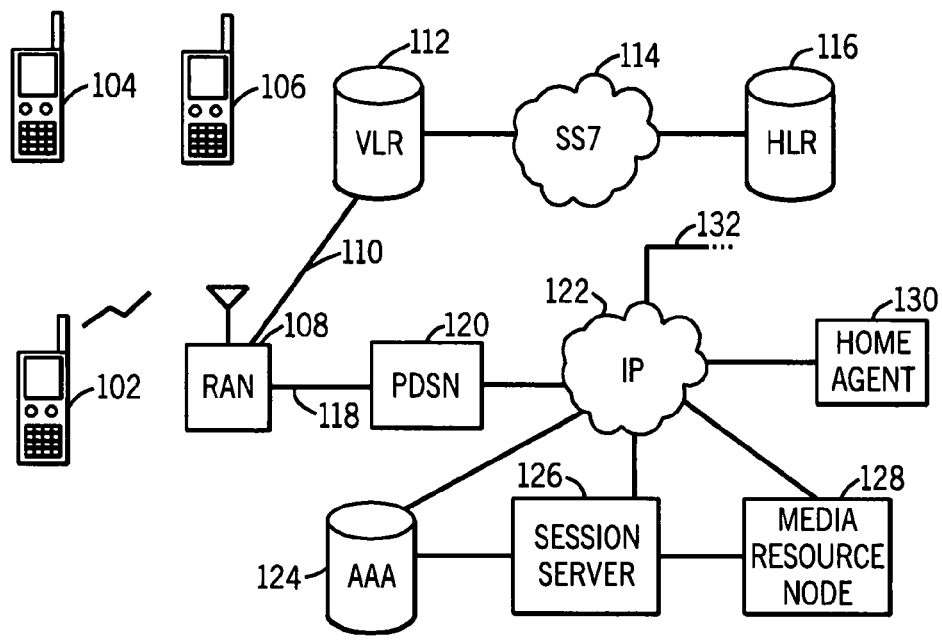
FIG. 1 is a block diagram of a wireless communications system suited for practicing an embodiment of the present invention.

FIG. 1 illustrates a wireless communications system that supports wireless user communication devices 102, 104 and 106 such as cellular telephones. A radio access network (RAN) 108 provides a wireless communication link between the system and the wireless user communication devices. This node may consist of a conventional wireless base station and a base station controller or a mobile switching center. The RAN 108 is representative of a plurality of radio access networks (not shown) disposed at different geographical locations to support wireless communications for the system. The RAN 108 is connected by a communication link 110 to a visiting location register (VLR) 112 that is connected by a signaling system 7 network 114 with a home location register (HLR) 116.

The RAN node 108 is also connected by communication link 118 to a packet data serving node (PDSN) 120 that provides an interface that supports a data link layer protocol to the mobile station (102) and that directs packets to a particular over the air connection that the RAN (108) provides for the mobile station (102). The IP network 122 is connected to PDSN 120 and also connected to an authentication authorization and accounting (AAA) node 124, session server 126, media resource function 128, home agent node 130, and a communication link 132 illustrating that the IP node 122 is also connected to other networks and nodes. The session server 126 is also connected to the AAA node 124 and media resource function 128. The AAA node 124 supports users of the system by providing authentication, authorization, and accounting functions. The session server 126 supports call control protocols and services such as one to many voice messaging. The media resource function 128 operates under the control of session server 126 and provides a packet duplication capability for supporting one to many voice messaging and a lost voice packet detector for detecting the loss of voice packets from an originating user prior to the receipt of an end of transmission signal. The home agent node 130 functions as an intermediate node for assigned wireless user communication devices by receiving packets from the assigned devices and transmitting packets from the network addressed to the assigned devices. The home agent node permits the user devices to roam over the entire coverage area of the wireless system by keeping track of which PDSN to use for communications with the user device.

The session server 126, media resource function 128 and home agent node 130 may each be represented by the same architecture consisting of a microprocessor supported by read-only memory, random access memory, nonvolatile storage memory, and an input/output interface device for the transmission and reception of packets. The microprocessor operating instructions for each of these elements will be apparent to those skilled in the art based on the description of the functionality and signaling that follow.

Figure 2:
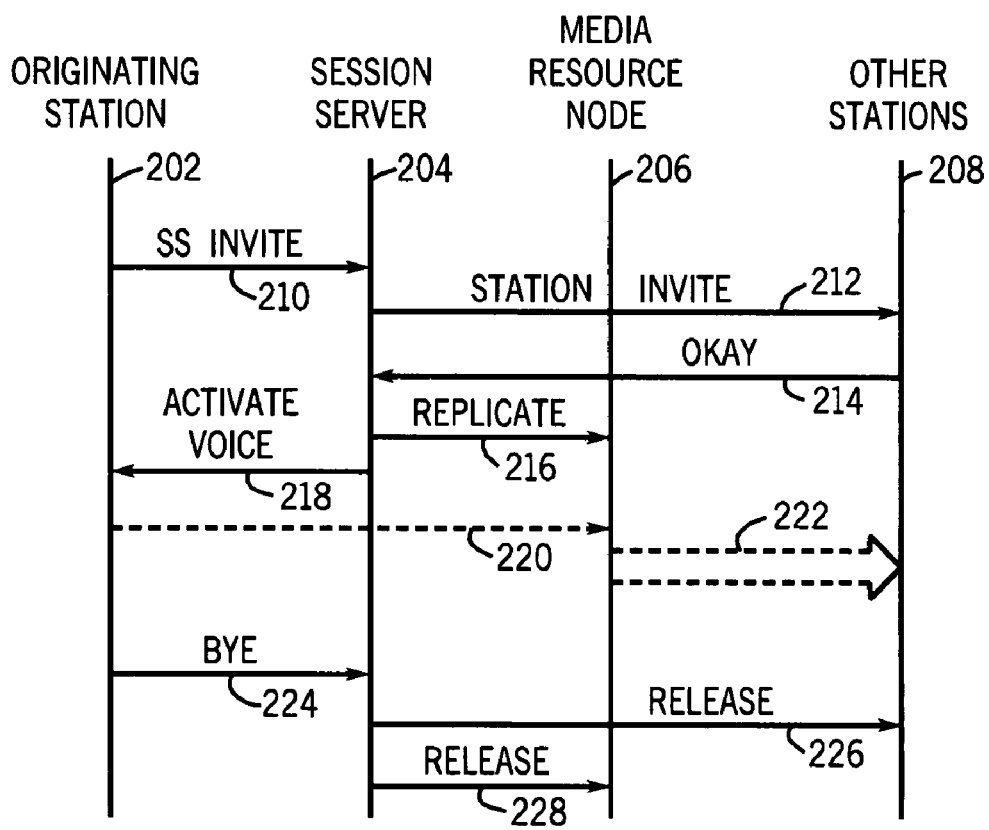
FIG. 2 is a diagram illustrating the transmission of signals in the system as shown in FIG. 1 in which an end of transmission signal is received.

FIG. 2 illustrates the signaling involved in establishing, conducting and terminating a one to many half-duplex voice messaging session in the telecommunications system shown in FIG. 1. The signaling diagram of FIG. 2 assumes that the wireless users have been initially registered with the system and that the wireless devices are on and are recognized by the system. As part of the service configuration portion of registration, users are assigned an identity and security information for authentication. The users are also assigned one or more group identifications that can be used to select the audience of a one to many voice transmission. In addition to the normal registration associated with the AAA node 124, the user also registers with the session server by providing the identity of the user's wireless device and the group identifications assigned to the user. Each user may belong to a plurality of groups that can be selected by an originating user for a one to many voice session. Following the completion of registration, the user's wireless device goes dormant so that air interface resources are not used when not needed. Handoffs are accommodated so that a user that moves outside the range of the RAN 108 but within the range of another RAN (not shown) of the system maintains communication with the system.

FIG. 2 illustrates a signaling diagram with lines 202, 204, 206 and 208 representing signals originating from or terminating to an originating station, session server, media resource node and other stations, respectively. In an illustrative example wireless device 102 corresponds to the originating station 202, session server 126 corresponds to session server 204, media resource node 128 corresponds to media resource node 206 and wireless devices 104 and 106 correspond to other stations 208. In order to clarify the signals more relevant to the exemplary method of the present invention, the number of signals shown in FIG. 2 has been limited. To assist in understanding, other signals may be described that are not depicted in FIG. 2. Reference should also be made to FIG. 1 while considering the signaling discussed in FIG. 2.

Users initiate half-duplex communications by pressing a push to talk button. In this example, a user of wireless device 102 first selects a set of users (other stations) by a group identification. Group identifications may be associated with buttons on device 102 or may consist of the entry of a numeric code by the user corresponding to the group, e.g. *1–*9 representing 9 different groups. The user then presses the push to talk button causing a session server invite signal 210 to be transmitted from originating station 202 to the session server 204. Signal 210 traverses RAN 108, PDSN 120 and IP network 122 to reach session server 126. The session server invite signal 210 includes, in addition to the identity of the originating wireless device, the group identification. The session server, after authenticating with AAA node 124 that the originating station is a valid registered user, determines the availability of members of the selected group by determining those members of the group that are currently registered with the session server. Based on the group identification selected by the originating station and the available members of the group, the session server selects a set of wireless devices to participate as audience members in a one to many conference. The session server 204 transmits a station invite 212 to the selected set of other stations. The session server may attempt to reach the selected members more than once. The session server transmits the station invite signal 212 by IP network 122 to home agent 130 that maintains an ongoing record of the PDSN associated with each registered user. The home agent 130 routes the station invite signal 212 by the IP network 122 to the corresponding PDSN 120 associated with each respective user to receive the station invite signal. Upon an other station 208 receiving the station invite signal 212, the other station transmits an okay signal 214 to the session server 204. Upon the session server receiving at least one okay signal 214, the session server 204 generates a replicate signal 216 transmitted to media resource node 206. The replicate signal identifies the originating station and the members selected by the session server to receive the one to many transmission from the originating station so that the media resource node 206 will be prepared to duplicate packets of voice received from the originating station. The session server also generates an activate voice signal 218 that is transmitted to the originating station. Upon receipt of the activate voice signal 218, the originating station wireless device 102 preferably provides audible or visual indicia to the user indicating that voice communications can proceed. The user can then talk into the microphone of device 102 where the user's speech is transmitted as signal 220 arriving as digital information carried by IP packets at media resource node 206. The media resource node duplicates the received voice packets from the originating station and addresses a corresponding packet to each member selected by the session server. These packets are transmitted as signal 222 to the selected members (other stations) by IP network 122 and home agent 130 which routes the received packets to the respective member by the corresponding PDSN 120. Thus, each of the selected members receives the spoken message from the originating station user. Since this is a one to many half-duplex communication, the members receiving the spoken message from the originating station cannot provide an immediate spoken reply without first obtaining authorization from the session server.

When the user of the originating station has completed the verbal communication, the user releases the push to talk button of the originating station device 102 causing the device to transmit a bye signal 224 to the session server. The bye signal alerts the session server of the termination of the half-duplex voice communication by the originating station. This causes the session server 204 to tear down the supporting communication paths by transmitting a release signal 226 to the other stations (selected members receiving the transmission from the originating station) via IP network 122 and home agent 130 that routes the signal to the respective devices of the selected members by the corresponding PDSN 120. The receipt of release signal 226 by the other stations preferably causes audible or visual indicia to be presented to the respective user as an indication that the transmission has been concluded. The session server also transmits a release signal 228 to the media resource node 206 indicating that resources associated with the duplication of packets transmitted from the originating station are released. This completes the half-duplex voice transmission by the originating station and releases the supporting telecommunication infrastructure that supported the transmission.

Figure 3:
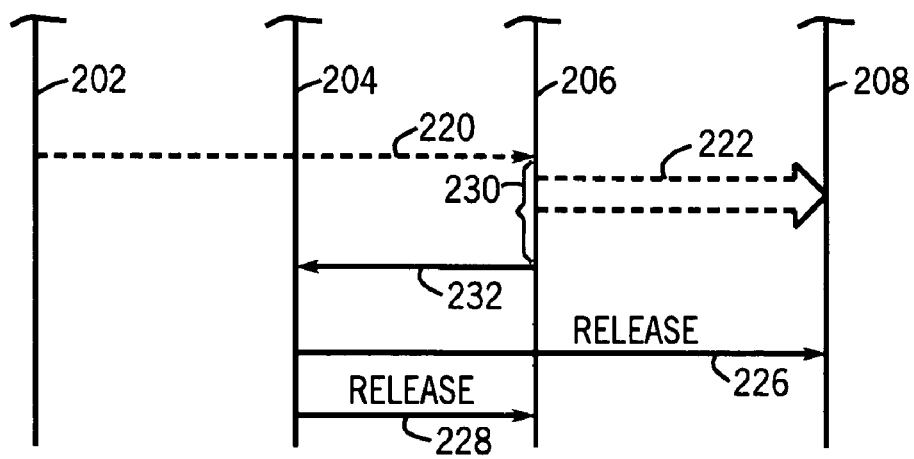
FIG. 3 is a diagram illustrating the transmission of signals in the system of FIG. 1 in accordance with an embodiment of the present invention in which an end of transmission signal is not received from the originating user.

FIG. 3 illustrates signals in accordance with an illustrative embodiment of the present invention that avoids unduly tying up the telecommunication infrastructure of FIG. 1 when communications are lost with the originating station during a half-duplex speech transmission. A common cause of such a loss of communication is the loss or significantly long disruption of the wireless signal between the user's wireless device 102 and any of the wireless base stations in the system. FIG. 3 begins with half-duplex communications between the originating station 202 and the selected members of a designated group as illustrated by voice packet signals 220 being received by media resource node 206 from the originating station, and the media resource node in turn duplicating and transmitting packets to the selected members 208. This condition will have been accomplished as explained above with regard to FIG. 2.

Media resource node 206 (element 128 in FIG. 1) includes a time monitoring function that constantly measures the time interval since the last voice packet was received from the originating station. If this time interval exceeds a predetermined amount of time, indicated by bracket 230 in FIG. 3, then the media resource node 206 transmits a signal 232 to session server 204 representing an alert that communications with the originating station 200 into may have been lost. The predetermined amount of time is preferably set by the system administrator of the telecommunications system based on statistical data concerning the normal maximum length of times between received voice packets so that the alert signal 232 is not unnecessarily generated. In general, a few seconds, e.g. 2–5 seconds, may represent an appropriate predetermined time.

The session server 204 generates release signals 226 and 228 as explained above with regard to FIG. 2. This releases the system infrastructure resources associated with supporting the half-duplex transmission initiated by the originating station 202. This prevents infrastructure resources and members receiving the voice transmission from the originating station from being unnecessarily occupied.

Generally such push to talk half-duplex communications systems are not utilized in a manner where a user captures a communication path and does not transmit voice information for significant periods of time. After requesting a voice path, an originating user will typically initiate voice communications quickly after receiving the path and does not typically employ long pauses of no speech activity while retaining the original path.

Figure 4:
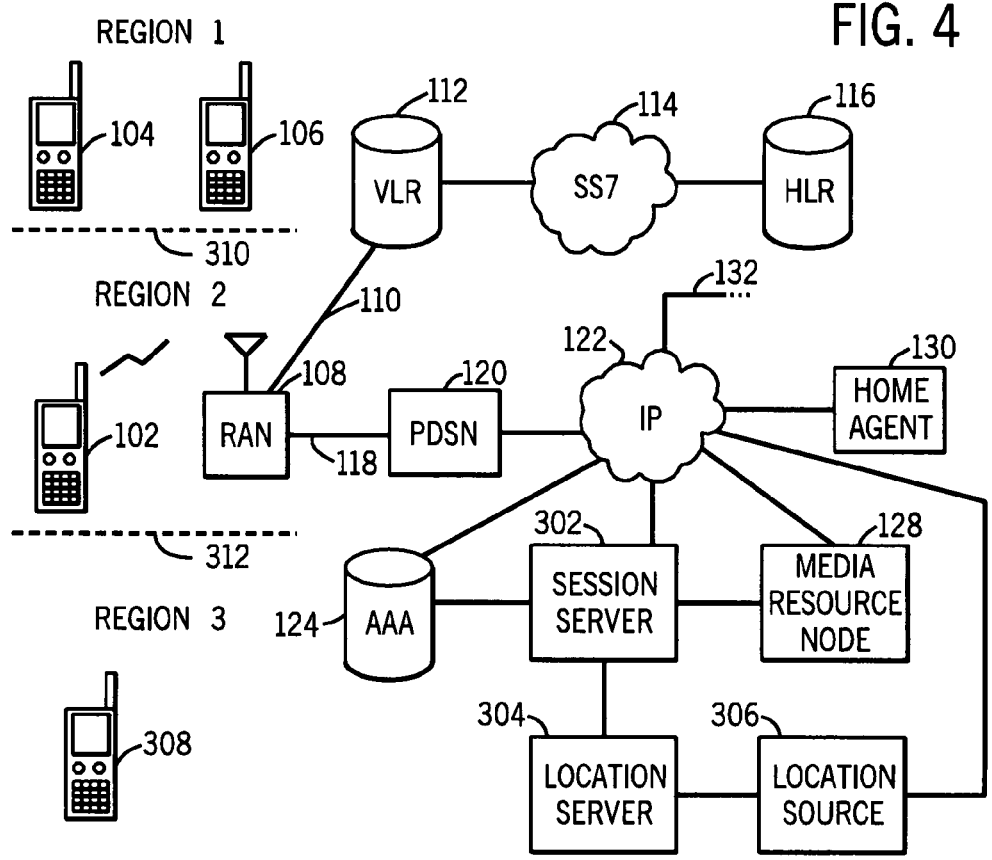
FIG. 4 is a block diagram of wireless communications system suited for practicing a further embodiment of the present invention.

FIG. 4 is a block diagram of a further embodiment of the present invention in which the current location of users is at least part of the decision of which members of a group selected by an originating user will receive the one to many communication. Since this embodiment is substantially similar to the embodiment described in FIG. 1, an explanation of the common elements and operation of these elements will not be repeated.

A session server 302 contains all of the functionality of session server 126 and contains additional functionality as will be described. The session server 302 is connected by a communication channel to location server 304 that is in turn connected to a location source 306 that is coupled to the IP network 122. The session server 302, location server 304 and location source 306 may each have an architecture as described for session server 126. The purpose of location source 306 is to monitor the geographic location of each of the registered, that is active, wireless devices in the telecommunication system.

Location source 306 may utilize any of a number of known techniques to monitor the geographic location of the wireless telephones with various degrees of granularity. For example, global positioning satellite systems can determine location within a few meters, known triangulation systems targeting on the transmitter of the wireless telephone can provide reasonable accuracy of its location, and monitoring the base station with which a wireless telephone is currently registered can determine location within the area of coverage of the base station. The location server 304 collects and maintains the location information from the location source 306, and stores the location for each active wireless telephone. The location information stored in location server 304 can be arranged for access on a per wireless device basis and/or all active wireless devices within a defined geographic region can be grouped together.

Dashed lines 310 and 312 indicate boundaries between different geographic regions. These regions may utilize different base stations to serve wireless devices in the respective regions, or may represent regions that are within a predetermined distance of a landmark, e.g. within 1 kilometer of a major roadway or within three kilometers of an airport or major building. The users of wireless devices 104 and 106 are in region 1, user of wireless device 102 is in region 2 and the user of wireless device 308 is in region 3.

Session server 302 is provided access to the geographic location information stored and maintained by location server 304. When a request for a one to many communication session is received from an originating user, the session server 302 can, depending on the nature of the requested communication session, select members of the group designated by the originating user based on the geographic location of all registered members of the group. For example, assume one group of subscribers is taxicab drivers and a taxicab driver needs to communicate with other taxicab drivers in the vicinity of a particular airport. The wireless device used by each taxi cab driver includes a plurality of buttons associated with major locations of activity for taxicabs, including the particular airport. The originating taxicab driver will push the button associated with the particular airport. This will cause a group identification associated with the particular airport to be transmitted as part of a path request upon pressing the push to talk button. The session server 302 upon receiving the request for a one to many session will access the location server 304 and identify active cab drivers that are near the airport. The session server 302 uses this location information in order to limit the selected members of the requested group to only those members that are in the requested geographic area. This eliminates establishing one to many communication paths with cab drivers that are not in a position to satisfy the request. This is advantageous from a telecommunications infrastructure perspective in that it limits the amount of bandwidth required to satisfy a one to many communication session since only those users at the required geographic location are provided with communication paths. It is also advantageous to subscribers because registered users within the group or fleet that are not in the desired audience group due to geographic location will not be bothered with listening to communications that are not relevant to them.

An on-going exchange will consist of as series of push to talk events by different users participating in the conversation. If rapid motion of the mobile station (102) takes place during the exchange, the group membership might change such that recently communicating users are no longer able to speak to each other. To prevent this situation, the session controller (302) maintains a recent activity timer such that it accepts push to talk INVITE from the mobile station with a changed location and will send an INVITE to a recently communicating mobile station even if it is outside a location boundary. Stored or cached information about the previous (recent) communications paths serving wireless users can be employed to maintain a communication path even if the wireless user moves outside a geographic region designated for audience members. Such cached information can be stored at any convenient node, e.g. session server or media resource node.

FIG. 5 illustrates a signal flow diagram illustrating selected signals in accordance with the embodiment as shown in FIG. 4. Signals are shown among the originating station 350, session server 352, location server 354, media resource node 356 and other stations 358. In accordance with an illustrative example, originating station 350 corresponds to wireless device 102, session server 352 corresponds with session server 302, location server 354 corresponds with location server 304, media resource node 356 corresponds with media resource node 128 and other paths 358 correspond with wireless device 308.

In an example, wireless devices 102, 104, 106 and 308 are all used by employees of the same construction company. A project manager of the construction company uses wireless device 102 at the home office in region 2. A site manager and construction foreman of the construction company use wireless devices 104 and 106, respectively, at a first construction site in region 1. A civil engineer of the construction company uses wireless device 308 at a second construction site in region 3. The project manager needs to communicate with all employees at the first construction site (region 1) concerning an issue that only relates to the first construction site.

The project manager pushes a button on wireless device 102 corresponding to the first construction site. Alternatively, the project manager could have entered a predetermined code, e.g. *01, corresponding to the first construction site. The project manager then presses the push to talk button of wireless device 102. In this example, wireless device 102 is the originating station 350 of FIG. 5 and pressing its push to talk button causes a session server invite signal 360 to be generated and transmitted to the session server. The session server invite signal 360 will include information identifying the originating wireless device 102 and the group information entered by the user. On receiving signal 360, session server 352 generates a member query signal 362 including the group information entered by the user and transmits it to the location server 354. In response to receiving signal 362, location server 354 uses the group information to identify active members of the group that are in the specified location. In this example location server 354 determines that wireless devices 104 and 106 (the site manager and construction foreman) are the only two members of group located in region 1. The civil engineer of the construction company although active using wireless device 308 is determined to be in region 3 and hence is not selected as a member by location server 354. A member location reply signal 364 is transmitted by the location server 354 to session server 352 and contains the identities of wireless units 104 and 106 as members of the audience to receive the one to many communication session requested by wireless device 102. The session server 352 generates a station invite signal 366 that is transmitted to the other stations 358 which in this example consist of wireless devices 104 and 106. As previously explained with regard to FIG. 1, the station invite signal 366 will be transmitted by session server 302 via IP network 122 to home agent 130 that determines the PDSN through which the devices 104 and 106 are connected and routes appropriately addressed IP packets to the selected wireless devices. The remaining signaling associated with setting up the one to many communication session and tearing it down will proceed as previously explained with regard to FIGS. 2 and 3.

The embodiments of the present invention have been described above with regard to a one to many communication session. However, it will be apparent to those skilled in the art that some of the aspects of the embodiments could be advantageously employed when the telecommunications system is utilized for a private call to a single wireless device. Monitoring for the possible loss of communication with the originating user during a voice transmission is also applicable to a private call. Also, aspects of the embodiments of the present invention could be advantageously applied when a small group of users is permitted to speak (transmit) simultaneously to an audience of other users such that packets from the small group of speakers are all delivered in a mixed audio output to the audience. Various modifications can be made to the illustrative embodiments without departing from the scope of the present invention.

We claim:

1. A method for releasing half-duplex communication paths in a telecommunications system where speech by an originating user is transmitted as packets and where an explicit signal for releasing the half-duplex communication paths is normally initiated by the originating user, the method comprising the steps of:

establishing half-duplex communication paths for speech from the originating user to a plurality of listening users by a session server;

replicating packets of speech received from the originating user at a media resource node;

transmitting the replicated speech packets to the plurality of listening users;

monitoring at the media resource node for a cessation of speech from the originating user occurring for a predetermined time interval; and transmitting a loss of speech signal from the media resource node to the session server upon the media resource node determining a cessation of speech from the originating user for the predetermined time interval.

2. The method according to claim 1 further comprising the step of releasing the communication paths to the listening users upon the cessation of speech from the originating user occurring for the predetermined time interval.

3. The method according to claim 1 wherein said establishing step establishes half-duplex communication paths using Internet protocol addressing and where in the media resource node replicates Internet protocol packets.

4. The method according to claim 1 further comprising the steps of establishing a wireless communication link between an originating user's radio and a wireless node in the telecommunications system, and transporting speech received from the originating user's radio over the wireless communication link in Internet protocol packets containing the received speech.

5. A method for releasing half-duplex communication paths in a telecommunications system where speech by an originating user is transmitted as packets and where an explicit signal for releasing the half-duplex communication paths is normally initiated by the originating user, the method comprising the steps of:

establishing half-duplex communication paths for speech from the originating user to a plurality of listening users by a session server;

replicating packets of speech received from the originating user at a media resource node;

transmitting the replicated speech packets to the plurality of listening users;

monitoring at the media resource node for a cessation of speech from the originating user occurring for a predetermined time interval;

transmitting a loss of speech signal from the media resource node to the session server upon the media resource node determining a cessation of speech from the originating user for the predetermined time interval; and releasing the half-duplex communication paths by the session server as a result of receiving the loss of speech signal.

6. The method according to claim 5 wherein said establishing step establishes half-duplex communication paths using Internet protocol addressing and wherein the media resource node replicates Internet protocol packets.

7. The method according to claim 5 further comprising the steps of establishing a wireless communication link between an originating user's radio and a wireless node in the telecommunications system, and transporting speech received from the originating user's radio over the wireless communication link in Internet protocol packets containing the received speech.

\* \* \* \* \*